UNITED STATES PATENT OFFICE.

WM. H. HAYES, OF ROCK ISLAND, ILLINOIS.

IMPROVED COMPOSITION FOR DRESSING MILLSTONES.

Specification forming part of Letters Patent No. 44,189, dated September 13, 1864.

*To all whom it may concern:*

Be it known that I, WILLIAM H. HAYES, of Rock Island, in the county of Rock Island and State of Illinois, have invented a new and Improved Composition for Dressing Millstones; and I do hereby declare that the following is a full, clear, and exact description thereof, which will enable others skilled in the art to fully understand and use the same.

Millstones, when dressed in the ordinary manner, will soon be covered with gum and glazing on their surfaces, and their quality to cut and grind is thereby materially impaired, the fine furrows are completely blocked up, and the stone has to be redressed at great expense and loss of time.

The object of this invention is to obviate this difficulty and to remove the glazing and gum from the surfaces of millstones, and to effect this purpose I use a composition mixed together of the following ingredients: muriatic acid, two ounces; carbonate of ammonia, one ounce; alum, pulverized, one ounce; saltpeter, one ounce; common salt, one ounce; vinegar, one pint; high-wine, one-half pint. The carbonate of ammonia, alum, saltpeter, and common salt is dissolved in the vinegar, and the muriatic acid and high wine is added, and after the whole mixture has been well stirred together it is fit for use. It is applied to the face of the millstones with a brush or in any other suitable manner, and by its use the glazing and gum are removed and the furrows preserve their original depth and power to cut and grind.

The application of my composition requires only a few minutes of time, and its effect is far superior to that of the diamond generally used for dressing millstones.

It must be remarked that instead of high-wine, a small quantity of alcohol can be used, and the quantity of liquids depends much upon their strength.

I do not wish to confine myself to the precise proportions above specified, but reserve the right to alter the same according to the quality of the ingredients.

I claim as new and desire to secure by Letters Patent—

The use, for dressing millstones, of a composition made of the ingredients above specified and mixed together in about the proportion and substantially in the manner set forth.

WM. H. HAYES.

Witnesses:
A. FAILINIG,
O. K. FERGUSON.